United States Patent
Hänsch

(10) Patent No.: US 9,926,739 B2
(45) Date of Patent: Mar. 27, 2018

(54) LIGHT-DIRECTING SYSTEM

(71) Applicant: Ettlin Aktiengesellschaft, Ettlingen (DE)

(72) Inventor: Frauke Susanne Hänsch, Karlsruhe (DE)

(73) Assignee: Ettlin Aktiengesellschaft, Ettlingen (DE)

( * ) Notice: Subject to any disclaimer, the term of this patent is extended or adjusted under 35 U.S.C. 154(b) by 0 days.

(21) Appl. No.: 15/130,497

(22) Filed: Apr. 15, 2016

(65) Prior Publication Data

US 2016/0230451 A1 Aug. 11, 2016

Related U.S. Application Data

(63) Continuation of application No. PCT/EP2014/072253, filed on Oct. 16, 2014.

(30) Foreign Application Priority Data

Oct. 16, 2013 (EP) .................................... 13189005

(51) Int. Cl.
  *E06B 9/24* (2006.01)
  *D03D 1/00* (2006.01)
  (Continued)

(52) U.S. Cl.
  CPC ............. *E06B 9/24* (2013.01); *D03D 1/0017* (2013.01); *D03D 9/00* (2013.01); *D03D 11/00* (2013.01);
  (Continued)

(58) Field of Classification Search
  CPC .. D03D 1/00; D03D 1/08; D03D 9/00; D03D 15/0083; D03D 15/0094; D03D 19/00;
  (Continued)

(56) References Cited

U.S. PATENT DOCUMENTS 2,153,755 A * 4/1939 Higgins ................. G03B 21/60
                                                     101/420
2,886,697 A    5/1959 Pomeroy
(Continued)

FOREIGN PATENT DOCUMENTS

DE       201 04 051 U1   7/2002
DE    20 2005 005 957 U1   6/2005
WO    WO 2012/160115 A1  11/2012

OTHER PUBLICATIONS

English translation of the International Preliminary Report on Patentability and Written Opinion of the International Search Authority, PCT/EP2014/072253, dated Apr. 19, 2016.

*Primary Examiner* — Christopher Mahoney
(74) *Attorney, Agent, or Firm* — Bose McKinney & Evans LLP

(57) ABSTRACT

This disclosure relates to a light-directing system, comprising a textile sheet material, which can be positioned in a light incidence region in front of a space and has a weft-thread layer composed of a plurality of weft threads, wherein the weft threads are extended substantially linearly and bound mesh openings of the sheet material. According to this disclosure, some or all weft threads have a non-circular thread cross-section bounded by a plurality of individual side parts and are arranged parallel to each other, the orientation of the side parts of the weft threads being uniform.

31 Claims, 3 Drawing Sheets

(51) Int. Cl.
*D03D 9/00* (2006.01)
*D03D 13/00* (2006.01)
*D03D 15/00* (2006.01)
*D03D 19/00* (2006.01)
*E04F 10/02* (2006.01)
*D03D 11/00* (2006.01)
*G02B 5/02* (2006.01)
*G02B 26/02* (2006.01)

(52) U.S. Cl.
CPC ......... *D03D 13/006* (2013.01); *D03D 13/008* (2013.01); *D03D 15/0083* (2013.01); *D03D 15/0094* (2013.01); *D03D 19/00* (2013.01); *E04F 10/02* (2013.01); *G02B 5/021* (2013.01); *G02B 5/0263* (2013.01); *G02B 5/0278* (2013.01); *G02B 5/0284* (2013.01); *G02B 26/02* (2013.01); *D10B 2331/04* (2013.01); *D10B 2401/20* (2013.01); *D10B 2503/03* (2013.01); *E06B 2009/2417* (2013.01)

(58) Field of Classification Search
CPC ... F21S 11/007; E06B 9/24; E06B 2009/2417
USPC ...... 442/2, 192–193, 195–196; 359/591, 601
See application file for complete search history.

(56) References Cited

U.S. PATENT DOCUMENTS

| | | | |
|---|---|---|---|
| 3,005,524 A | 10/1961 | Pomeroy | |
| 5,251,065 A * | 10/1993 | Uetsuki | G03B 21/60 348/767 |
| 5,998,310 A * | 12/1999 | Bowen, Jr. | D21F 1/0027 139/383 A |
| 6,440,528 B1 * | 8/2002 | Pike | A45B 25/18 160/166.1 |
| 7,554,730 B1 | 6/2009 | Kuo et al. | |
| 2006/0057332 A1 * | 3/2006 | Li | B44D 1/02 428/131 |
| 2010/0189980 A1 * | 7/2010 | Glittenberg | E04F 13/0867 428/220 |
| 2014/0080375 A1 * | 3/2014 | Hansch | D03D 1/007 442/132 |

\* cited by examiner

LIGHT-DIRECTING SYSTEM

RELATED APPLICATIONS

This application is a continuation of PCT/EP2014/072253, filed Oct. 16, 2014, which claims priority to EP 13189005.5, filed Oct. 16, 2013, both of which are hereby incorporated herein by reference in their entireties.

BACKGROUND

The invention relates to a light-directing system, in particular for sunlight, having a textile sheet material which in a light-incidence region is positionable in front of a space to be shielded or to be illuminated, or in the use state is positioned in front thereof, and has a weft-thread layer which is formed from a multiplicity of weft threads, wherein the weft threads are stretched in a substantially linear manner and delimit mesh openings of the textile fabric.

A weather-protection device having a textile fabric which forms a shield against weather influences as well as solar radiation is known from WO 2012/160115 A1, which textile fabric develops the protective functions thereof in that the warp threads and weft threads delimit elongate rectangular mesh openings, wherein the opening length is at least 10 times the opening width. It is achieved therewith that undesirable radiation and precipitation is repelled by the tight longitudinal delimitations. However, by virtue of the round thread cross-sections light reflections into the shielded region do also occur.

SUMMARY

Proceeding therefrom, this disclosure is based on the object of further improving the devices known in the prior art and of achieving a two-dimensional structure for influencing in a targeted manner incident light above all of sunlight or daylight, respectively, in a region of a building.

This disclosure proceeds from the concept of achieving a defined light-directing structure by adapting the topography of a woven fabric. Accordingly, it is proposed according to this disclosure that some or all weft threads have a non-circular thread cross-section which is delimited by a plurality of individual lateral portions or lateral areas, respectively, and said weft threads at uniform orientation of the lateral portions thereof are disposed as unidirectional threads so as to be mutually parallel. In this manner, targeted light-directing is made possible in that uniformly aligned lateral portions form an optical surface for direct (mirrored) reflection and/or refraction. As opposed to round cross-sections, ranges of incident angles which are determined by segmented thread profiles are effectively masked also with a view to multiple reflections, such that a type of "louver effect" is achievable by a thread structure. The degree of protection is thus substantially determined by the thread profile while suitable mesh openings may be kept free for viewing therethrough.

In order for the light-directing range to be optimized both in terms of capture as well as reflection, it is advantageous when the lateral portions have at least one planar or concave region.

Further improvement results from the lateral portions being mutually delimited by protrusions, clearances, or edges in the thread cross-section.

It is particularly favorable in terms of angular orientation when the non-circular weft threads have a polygonal, in particular a triangular or trilobal cross-section.

A further variant of this disclosure provides that the weft threads are disposed in weft-thread groups having thread diameters which vary in a groupwise manner, that is to say that thread diameters vary in every group, wherein the lateral portions of the weft-thread groups are uniformly oriented. By virtue of the various thread diameters in every group, said various thread diameters being repeated from one group to another, lateral portions which in relation to the group are likewise variably oriented result quasi as a sheathing end of the weft-thread group or of the repeat, respectively, such that the above-mentioned advantages are likewise achievable. The repeat forms the smallest self-repeating part of the weave, that is to say that the weft-thread groups are always placed on top of one another in the same manner.

For targeted influencing of light radiation it is advantageous when at least one side portion which faces away from the space or faces the light-incidence region is impinged as a light-directing area with incident light.

In order for effective shading to be enabled and for glare and unintended heat input to be avoided, it is advantageous when the weft-threads or weft thread groups, respectively, by way of at least one lateral portion form a reflector for reflecting incident light. Advantageously, the weft threads should run transversely to the plane of the radiation path.

Further improvement of shading while at the same time providing good viewing therethrough is achieved in that the weft threads are provided with a light-reflecting or light-absorbing coating, and/or are dyed dark.

In order for radiation regions to be influenced in particular in the case of sunlight incident from obliquely above, it is advantageous when the weft threads in a delimited angular range are uniformly coated so as to be reflective or absorbent.

Further functionality in the sense of targeted utilization of light may be achieved in that the light-directing area forms a light-permeable surface, the weft threads being transparent, such that light is directed away from the light-incidence side and thus into the space to be illuminated. On account thereof, the brightness in interior rooms may be influenced without the employment of artificial lighting.

Advantageously, the weft threads are formed from a monofilament thread material such that defined optical surfaces are achieved. In order for non-directed diffusion and thus also for glare protection to be optionally enabled, multifilament yarns may also be additionally employed.

A particularly preferable structure provides that that the textile fabric has a dual-layer thread structure of warp threads forming a warp-thread layer, and of weft threads forming a weft-thread layer which is parallel with said warp-thread layer, wherein the warp threads and the weft threads are interconnected by binder threads and the weft threads bear on a single side of the warp-thread layer.

The weft threads preferably run horizontally, the weft-thread layer extending vertically.

In order to facilitate utilization, it is advantageous when the textile fabric is mounted so as to be two-dimensional in a mounting construction or is unrollable therefrom. It may also be advantageous here when the textile fabric is embedded in a transparent support plate or in a composite structure, respectively, for example in laminated glass.

A further advantageous embodiment provides that the textile fabric is disposed or is positionable in a mounting construction on the external side of a building, in front of a building opening, the weft threads running horizontally.

In order for targeted light-directing to be enabled, it is particularly advantageous when the weft threads, on the light-incidence side thereof that faces the light-incidence region or on the external side, respectively, are free from warp threads, and said weft threads across the length thereof are thus not continuously covered by warp threads.

In order to achieve reflection or transmission which is angle-selective and thus dependent on the position of the sun, it is advantageous when the weft threads run horizontally and have a reflective area which points obliquely upward into the light-incidence region, and in that the weft threads are held so as to be mutually spaced apart, wherein the spacing is determined such that incident light from obliquely above, when above a given height-related critical angle, is reflected into the light-incidence region and, when therebelow, is passed between the weft threads through into the space that faces away from the light-incidence region.

It is particularly favorable when the spacing of the weft threads has a defined uniform value between 0.05 mm and 0.1 mm.

In order to provide a suitable transition from reflection of sunlight in the summer to permeability in winter, the height-related critical angle should be in the range between 40° and 50°.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows a light-directing system having a textile fabric which is disposed in front of a building, in a schematic illustration;

DETAILED DESCRIPTION

Figure 2:
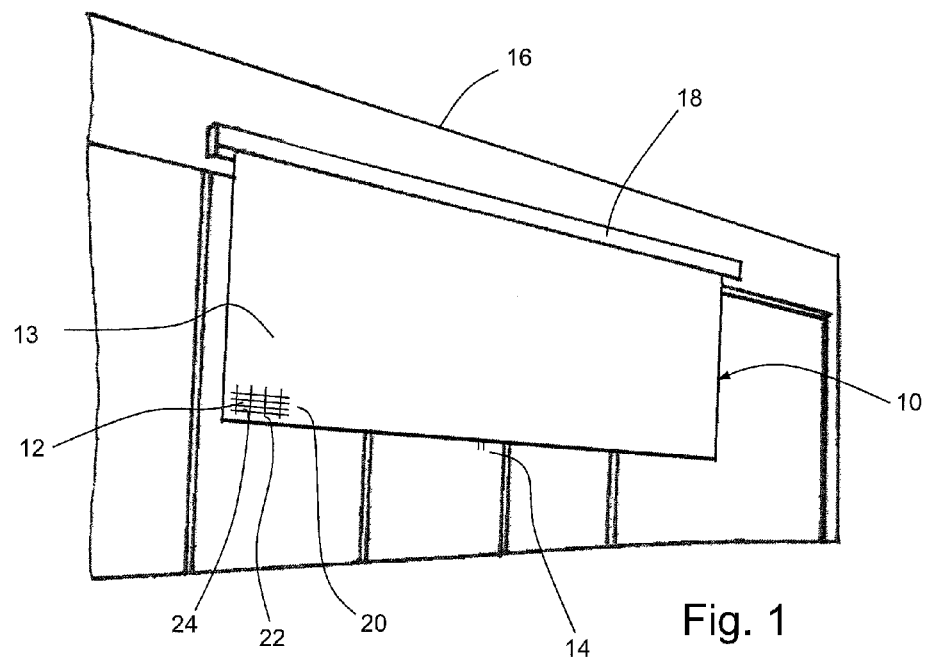
FIGS. 2 and 3 show the textile fabric which is configured as a dual-layer leno-woven fabric in a partial plan view onto the weft-thread side and onto the warp-thread side.

The embodiments described below are not intended to be exhaustive or to limit the invention to the precise forms disclosed in the following description. Rather, the embodiments are chosen and described so that others skilled in the art may appreciate and understand the principles and practices of this disclosure.

It should be understood that the terms "horizontal" and "vertical" are generally used herein to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "weft thread," "warp thread," "fabric," to name just a few, should be interpreted when appearing in this disclosure and claims to mean "one or more" or "at least one." All other terms used herein should be similarly interpreted unless it is made explicit that a singular interpretation is intended.

The light-directing system 10 which is illustrated in the drawing comprises a textile fabric 12 which is disposed in a light-incidence region 13 in front of a space 14 which is to be shielded or to be illuminated, in the region of a building opening, on the external side of a building 16. To this end, the textile fabric 12 is extendable in a web-shaped manner as a roller blind from a winding device 18. The space 14 behind the textile fabric 12, depending on the embodiment of the textile fabric 12, is shaded against direct solar radiation or is illuminated therewith in a targeted manner, respectively.

As is indicated (not to scale) in FIG. 1, the textile fabric 12 has weft threads 20 and warp threads 22 which are interconnected in a mesh-like manner. The warp threads 22, at comparatively large mutual thread spacing, run in the vertical direction, while the horizontal weft threads 20, while adhering to a comparatively tight mutual thread spacing, intersect the warp threads 22 at a right angle. In this manner, rectangular mesh openings 24 in the mesh-shaped textile fabric 12, which to a certain degree allow viewing therethrough, are kept free.

Figure 3:
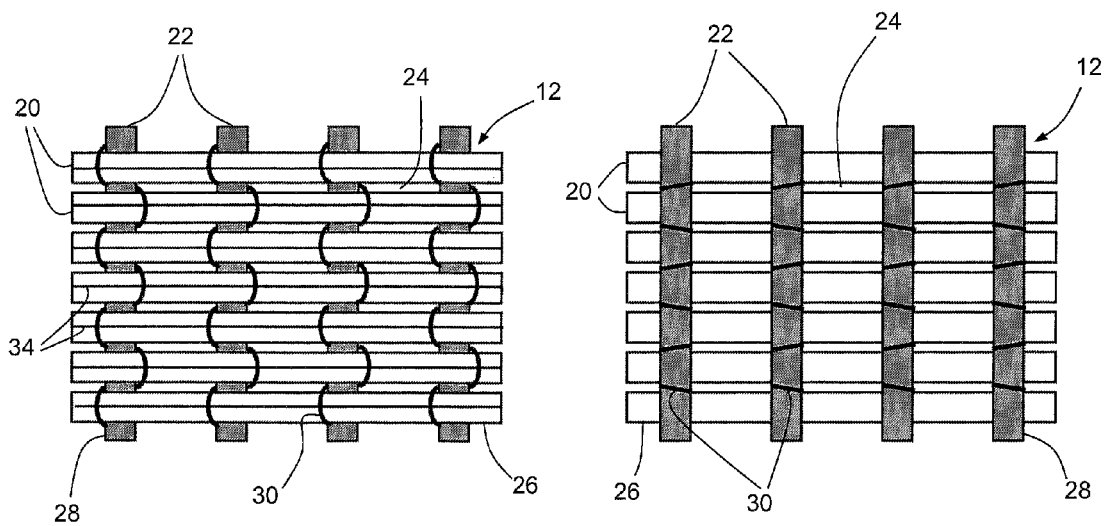

As is visualized in FIGS. 2 and 3, the textile fabric 12 has a two-dimensional dual-layer structure in which the weft threads 20 and warp threads 22 are stretched in a linear manner and in each case form a dedicated planar thread layer 26, 28. The two thread layers 26, 28 in each case define a single separate plane. The weft-thread layer 26 thus on one side or on the external side, respectively, bears on the warp-thread layer 28, wherein the warp-thread layer 28 forms exclusively the internal side of the fabric which faces the building space 14, and the weft-thread layer 26 forms the external side of the fabric which is directed outward toward the light source or the sun, respectively.

When viewed in the direction of the surface normal of the textile fabric 12, unobstructed mesh openings 24 which on the longitudinal side are delimited by the weft threads 20 thus result. In order for the layers to be mutually fixed, the weft threads 20 and warp threads 22 are wrapped in the manner of a leno weave by comparatively thin binder threads 30. The binder threads 30 run along the warp threads 22. Said binder threads 30 thereby traverse the two thread layers 26, 28 of the warp and weft threads and encompass the external sides thereof that face away from one another.

The warp threads, weft threads, and binder threads are expediently composed of a monofilament polymer thread material, for example of PET. The thread thicknesses of the weft threads and warp threads 20, 22 are in the range between 0.1 to 2.4 mm, while the thinner binder threads 30 have a thickness of 0.05 to 0.1 mm. In the case of non-round cross-sections, the maximum transverse dimension is determined as the thread thickness. The mesh openings 24 result from the spacings of 0.05 to 2 mm between adjacent weft threads 20, and from the spacings of 0.6 to 5 mm between warp thread centers.

In a first embodiment the weft threads 20 have a non-circular thread cross-section and are disposed so as to be mutually parallel, having uniform orientation. Uniform orientation may be obtained in that the weft threads 20 during weft insertion are drawn off tangentially and thus without twist from a supply package and are kept tensioned.

Figure 4:
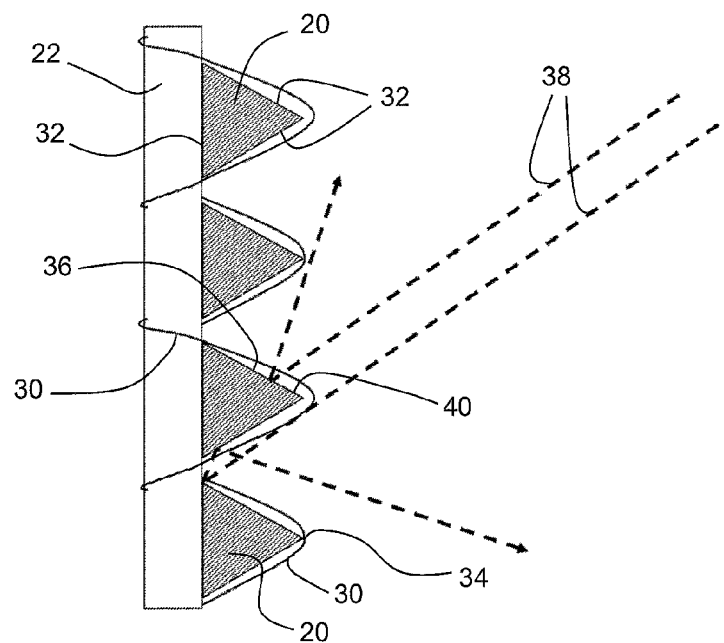
FIG. 4 shows the textile fabric having triangular weft threads and light rays which are reflected thereon, in a fragmented vertical sectional view.

As can best be seen from FIG. 4, the weft threads 20, which are triangular in the cross-section, have three planar lateral faces or lateral portions 32, respectively, which are mutually delimited by edges 34 which converge at an acute angle. By virtue of uniform orientation, all weft threads 20 by way of one side bear on the layer of warp threads 22, while the lateral portions 32 which are inclined away from the warp threads 22 are impingeable as a light-directing area 32 with incident sunlight 38.

In the configuration which is visualized in FIG. 4, the weft threads 20 as micro-louvers form a reflector to reflect incident light 38. Here, at least the light-directing area 36 is provided with a reflective coating 40 such that light is reflected in a mirrored manner. Such a segmented coating may be produced, for example, by directed vapor deposition of a metal layer on the weft threads 20. In the case of a reflective coating across the full area on all lateral portions, multiple reflections may also lead to reflection of the light 38 and thus to effective shading of the space 14 behind the textile fabric 12.

In order to avoid that reflected light radiation passes through the textile fabric 12 between the threads 20, 22, radiation-absorbing additives may also be added to the thread material. Viewing therethrough from the inside to the outside may be improved in that the thread material is dyed dark.

The degree of reflection of the textile fabric 12 may be adjusted by way of the weft-thread density and thus by way of the thread spacings and by way of the thread diameters. In principle, zonal variation of the thread densities and thread thicknesses is also possible.

In a further variant the weft and warp threads 20, 22 are composed of a transparent thread material, wherein incident light for targeted illumination is directed into the space 14 by partial reflection and refraction at the light-directing areas 36. Weft threads 20 having combinations of reflective and transmissive lateral portions 32 are also conceivable, for example in order to avoid direct solar radiation onto the floor of a space 14 but to otherwise enable illumination.

Figure 5:
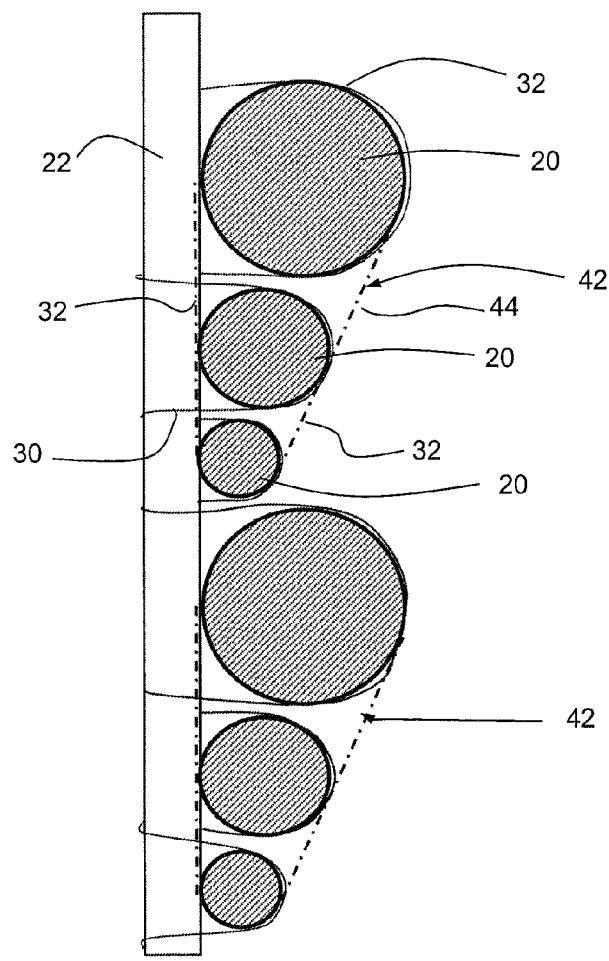
FIG. 5 shows a further embodiment, having weft-thread groups of various diameters, in an illustration corresponding to that of FIG. 4.

In the embodiment shown in FIG. 5, same or similar parts as have been described here above are provided with the same reference signs. The substantial difference lies in that the weft threads 20 have a circular cross-section and are disposed in weft-thread groups 42 having various thread diameters per group. This means that a plurality of weft threads 20 which differ from one another in terms of their thread diameter are grouped in every weft-thread group 42. The weft-thread groups 42 here are uniformly oriented, wherein lateral portions 32 are defined by the sheathing end 44 of the respective weft threads 20. As shown in FIG. 5, the placement of the different size threads relative to one another is the same in each of the groups. Here too, an arrangement similar to that of a louver is implemented.

Shading in a desired angular range may be influenced by suitably adapting the thread diameter. The lateral portion 32 which points obliquely downward may here be determined by a common tangent on the thread cross-sections.

Figure 6:
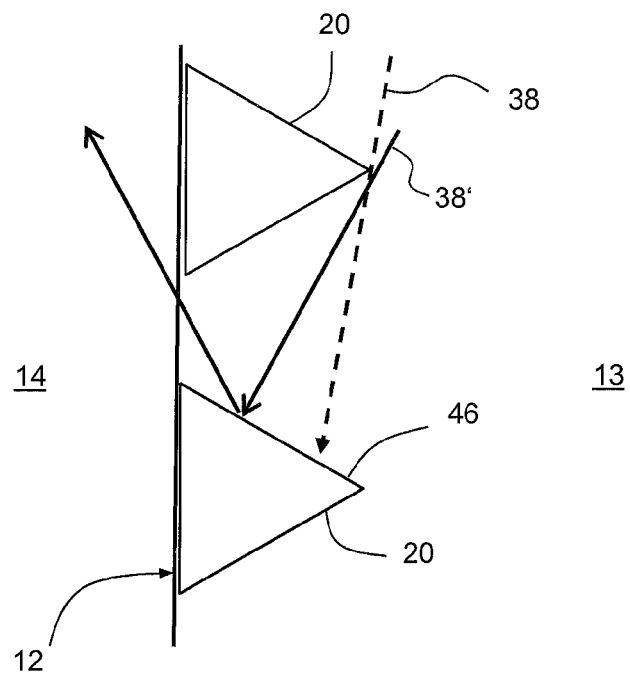
FIGS. 6 and 7 show exemplary embodiments of the textile fabric, having an angle-selective transmission of light rays, in an illustration corresponding to those of FIGS. 4 and 5.
Figure 7:
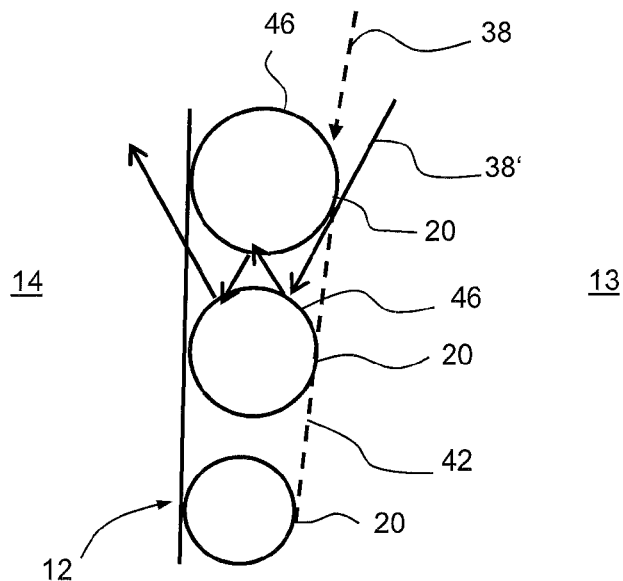

FIGS. 6 and 7 visualize the possibility of angle-selective shading or illumination of the space 14 depending on the position of the sun, respectively. This means that the textile fabric 12 in the case of a high position of the sun, and thus at a steep incident angle or impact angle, respectively, reflects as many of the sun rays 38 as possible. By contrast, in the case of a flat angle, as much as possible of the radiation 38' is directed into the space 14. In this manner, utilization of solar radiation that is adapted to the seasons may be achieved.

In order for this property to be implemented in the textile fabric 12, the horizontally running weft threads 20 should have a reflection area 46 which points obliquely upward into the light-incidence region 13. Here, the mutual spacing of the weft threads in the woven fabric is adjusted such that light which is incident from obliquely above, when above a given height-related critical angle, is reflected into the light-incidence region 13 and, when therebelow, is passed through the thread gap between the weft threads 20, into the space 14. Here, multiple reflections may also occur, as is visualized in FIG. 7 for the thread group 42. There, the circumferential regions of the weft threads 20 that point obliquely upward act as a reflection area 46 for the primary angle selection, wherein by virtue of the reduction in terms of diameter the upper weft thread of each thread group is substantially selective for the return reflection into the incidence region 13. The weft thread spacing should expediently be in the range between 0.05 mm and 0.1 mm. Adaption of the spacing may be determined by simple experiments or else by simple geometric considerations.

In principle, instead of the half-cross leno weave described for producing a planar weft-thread layer 26, it is also possible for a structure having stretched weft threads 20 to be implemented by warp-knitted fabric (warp-knitted and Raschel-knitted), a cross-laid structure, or a woven fabric in plain weave, for example. In the case of the warp-knitted fabric, the stretched weft threads are held in a stitch. In this case, the stitch wales replace the warp thread. In the case of the cross-laid structure, thread layers are deposited unidirectionally on top of one another. The structure is then fixed by interloping and stitching. In a plain weave, substantially linear weft threads may be implemented in that the diameter of the weft in comparison to the warp threads is significantly larger and the warp-thread tension during production is kept low. In this way, only the warp-thread system undulates while the weft lies stretched between the warp threads. Weft threads which are stretched in a substantially linear manner result in all cases, wherein the deviations from linearity are minor in comparison with the thread diameter.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:
1. A light-directing system, comprising:
a textile fabric configured to be positioned in a light-incidence region in front of a space to be shielded or illuminated, the textile fabric having a weft-thread layer formed from a multiplicity of weft threads that are stretched in a substantially linear manner and delimit mesh openings of the textile fabric;
wherein some or all of the weft threads have a non-circular cross-section which is delimited by a plurality of individual lateral portions, the weft threads being uniformly oriented and positioned mutually parallel;
further wherein the textile fabric has a dual-layer thread structure of warp threads forming a warp-thread layer and of weft threads forming a weft-thread layer parallel to said warp-thread layer, wherein the warp threads and the weft threads are interconnected by binder threads and the weft threads bear on one side of the warp-thread layer.

2. The light-directing system as claimed in claim 1, wherein the lateral portions have at least one planar or concave region.

3. The light-directing system as claimed in claim 1, wherein the lateral portions are mutually delimited by protrusions, clearances, or edges in the thread cross-section.

4. The light-directing system as claimed in claim 1, wherein the non-circular cross-section comprises a polygon.

5. The light-directing system as claimed in claim 1, wherein the non-circular cross-section comprises a triangular cross-section or trilobal cross-section.

6. The light-directing system as claimed in claim 1, wherein at least one of the lateral portions forms a reflector for reflecting incident light.

7. The light-directing system as claimed in claim 1, wherein the weft threads have a light-reflecting or light-absorbing coating and/or are dyed dark.

8. The light-directing system as claimed in claim 1, wherein the weft threads in a delimited angular range are uniformly coated to be reflective or absorbent.

9. The light-directing system as claimed in claim 1, wherein the light-directing area forms a light-permeable surface and wherein the weft threads are transparent, such that light can be directed through the transparent weft threads into the space to be illuminated.

10. The light-directing system as claimed in claim 1, wherein the weft threads are formed from a monofilament thread material.

11. The light-directing system as claimed in claim 1, wherein the textile fabric is mounted as a two-dimensional construction or is unrollable.

12. The light-directing system as claimed in claim 1, wherein the textile fabric is embedded in a transparent support plate or composite structure.

13. The light-directing system as claimed in claim 1, wherein the textile fabric is configured to be positioned on the external side of a building, in front of a building opening with the weft threads running horizontally.

14. The light-directing system as claimed in claim 1, wherein the weft threads, on an external side thereof that is configured to face the light-incidence region, are free from warp threads throughout.

15. The light-directing system as claimed in claim 1, wherein the weft threads run horizontally and have a reflective area configured to point obliquely upward into the light-incidence region, and the weft threads are held mutually spaced apart, wherein the spacing causes incident light from obliquely above a given height-related critical angle to be reflected into the light-incidence region and incident light from below the critical angle to be passed between the weft threads into the space that faces away from the light-incidence region.

16. The light-directing system as claimed in claim 15, wherein the spacing of the weft threads is between 0.05 mm and 0.1 mm.

17. The light-directing system as claimed in claim 15, wherein the height-related critical angle is between 40° and 50°.

18. A light-directing system, comprising:
a textile fabric configured to be positioned in a light-incidence region in front of a space to be shielded or illuminated, the textile fabric having a weft-thread layer formed from a multiplicity of weft threads that are stretched in a substantially linear manner and delimit mesh openings of the textile fabric;
wherein the weft threads are disposed in weft-thread groups having thread diameters which vary in a group-wise manner and placement of the different diameter threads relative to one another is the same in each of the groups;
further wherein the textile fabric has a dual-layer thread structure of warp threads forming a warp-thread layer and of weft threads forming a weft-thread layer parallel to said warp-thread layer, wherein the warp threads and the weft threads are interconnected by binder threads and the weft threads bear on one side of the warp-thread layer.

19. The light-directing system as claimed in claim 18, wherein at least one lateral portion of the weft-thread groups forms a reflector for reflecting incident light.

20. The light-directing system as claimed in claim 19, wherein one of the lateral portions configured to face away from the space is configured to be impinged as a light-directing area with incident light.

21. The light-directing system as claimed in claim 18, wherein the weft threads have a light-reflecting or light-absorbing coating and/or are dyed dark.

22. The light-directing system as claimed in claim 18, wherein the weft threads in a delimited angular range are uniformly coated so as to be reflective or absorbent.

23. The light-directing system as claimed in claim 18, wherein the light-directing area forms a light-permeable surface and wherein the weft threads are transparent, such that light can be directed through the transparent weft threads into the space to be illuminated.

24. The light-directing system as claimed in claim 18, wherein the weft threads are formed from a monofilament thread material.

25. The light-directing system as claimed in claim 18, wherein the textile fabric is mounted as a two-dimensional construction or is unrollable.

26. The light-directing system as claimed in claim 18, wherein the textile fabric is embedded in a transparent support plate or composite structure.

27. The light-directing system as claimed in claim 18, wherein the textile fabric is configured to be positioned on the external side of a building, in front of a building opening with the weft threads running horizontally.

28. The light-directing system as claimed in claim 18, wherein the weft threads, on an external side thereof that is configured to face the light-incidence region, are free from warp threads throughout.

29. The light-directing system as claimed in claim 18, wherein the weft threads run horizontally and have a reflective area configured to point obliquely upward into the light-incidence region, and the weft threads are held mutually spaced apart, wherein the spacing causes incident light from obliquely above a given height-related critical angle to be reflected into the light-incidence region and incident light from below the critical angle to be passed between the weft threads into the space that faces away from the light-incidence region.

30. The light-directing system as claimed in claim 29, wherein the spacing of the weft threads is between 0.05 mm and 0.1 mm.

31. The light-directing system as claimed in claim 29, wherein the height-related critical angle is between 40° and 50°.

* * * * *